(12) United States Patent
Borch-Jensen et al.

(10) Patent No.: US 9,515,466 B2
(45) Date of Patent: Dec. 6, 2016

(54) CABLE ASSEMBLY HOLDING APPARATUS

(75) Inventors: Niels Joergen Borch-Jensen, Billum (DK); Johnny Soerensen, Videbæk (DK)

(73) Assignee: SIEMENS AKTIENGESELLSCHAFT (DE)

( * ) Notice: Subject to any disclaimer, the term of this patent is extended or adjusted under 35 U.S.C. 154(b) by 3 days.

(21) Appl. No.: 14/368,576

(22) PCT Filed: Jul. 19, 2012

(86) PCT No.: PCT/EP2012/064157
§ 371 (c)(1),
(2), (4) Date: Jun. 30, 2014

(87) PCT Pub. No.: WO2013/113407
PCT Pub. Date: Aug. 8, 2013

(65) Prior Publication Data
US 2014/0374546 A1    Dec. 25, 2014

(30) Foreign Application Priority Data
Feb. 2, 2012 (EP) .................................... 12153686

(51) Int. Cl.
*F16L 1/12* (2006.01)
*H02G 3/04* (2006.01)
(Continued)

(52) U.S. Cl.
CPC ............ *H02G 3/0475* (2013.01); *F16G 13/16* (2013.01); *H02G 1/10* (2013.01); *Y10T 29/49826* (2015.01)

(58) Field of Classification Search
CPC .......... H02G 3/0475; H02G 1/10; H02G 3/04;
H02G 3/02; H02G 1/08; F16G 13/16; F16L 1/12; F16L 1/123; F16L 1/14; F16L 1/15; F16L 1/20; E21B 17/017
(Continued)

(56) References Cited

U.S. PATENT DOCUMENTS

| 1,778,040 A | * | 10/1930 | Rutherford | .......... H02G 3/0475 138/118 |
| 2,684,512 A | * | 7/1954 | Beman | ................. H01B 7/0045 174/72 A |

(Continued)

FOREIGN PATENT DOCUMENTS

| CN | 1083193 A | 3/1994 |
| CN | 201332241 Y | 10/2009 |

(Continued)

OTHER PUBLICATIONS

International Search Report and Written Opinion; PCT/EP2012/064157; International Filing Date: Jul. 19, 2012; Siemens Aktiengesellschaft; 11 pgs.
(Continued)

*Primary Examiner* — Terrell McKinnon
*Assistant Examiner* — Michael McDuffie
(74) *Attorney, Agent, or Firm* — Schmeiser Olsen & Watts LLP

(57) ABSTRACT

The present invention concerns a cable assembly holding apparatus realized to hold a cable assembly between an upper level of an offshore facility and a lower level, comprising a set of open tubes, wherein an open tube comprises a longitudinal slit along its length, through which the cable assembly is introduced into the open tube. The invention further concerns an offshore facility comprising the cable assembly holding apparatus and a method of suspending the cable assembly from an upper level of an offshore facility.

19 Claims, 9 Drawing Sheets

(51) Int. Cl.
*H02G 1/10* (2006.01)
*F16G 13/16* (2006.01)

(58) Field of Classification Search
USPC ............... 405/170, 158, 166, 167, 173, 174, 184, 405/184.4, 211, 216, 168.1, 157; 174/70 C, 72 A, 174/95–98; 248/59, 72
See application file for complete search history.

(56) References Cited

U.S. PATENT DOCUMENTS

| | | | | |
|---|---|---|---|---|
| 3,226,728 A * | 12/1965 | Walvoord | ........... | E21B 43/0107 166/351 |
| 3,434,296 A * | 3/1969 | Geer | ................... | E21B 43/0107 166/343 |
| 3,487,648 A * | 1/1970 | Lawrence | ............... | B63B 35/03 226/168 |
| 3,503,218 A * | 3/1970 | McLeod | ............. | E21B 43/0107 166/359 |
| 3,595,312 A * | 7/1971 | Matthews, Jr. | ..... | E21B 43/0107 166/351 |
| 3,685,306 A * | 8/1972 | Mott | ........................ | F16L 1/203 226/24 |
| 3,775,987 A * | 12/1973 | Rochelle | ................. | B63B 35/03 226/195 |
| 3,822,559 A * | 7/1974 | Matthews, Jr. | ......... | F16L 1/225 226/106 |
| 3,901,043 A * | 8/1975 | Silvestri | ................... | F16L 1/225 16/357 |
| 3,911,689 A * | 10/1975 | Hogan | ...................... | F16L 1/16 405/166 |
| 3,955,599 A * | 5/1976 | Walker | .................... | B21D 7/10 138/103 |
| 4,023,371 A * | 5/1977 | Bryant, Jr. | ................ | F16L 1/15 166/359 |
| 4,098,091 A * | 7/1978 | Desai | .................. | E21B 43/0107 405/169 |
| RE30,846 E * | 1/1982 | Lang | ........................ | F16L 1/203 405/168.3 |
| 4,472,080 A * | 9/1984 | Lawson | ................ | F16L 37/002 166/347 |
| 4,513,787 A | 4/1985 | Hegler et al. | | |
| 4,523,877 A * | 6/1985 | Finn | .......................... | F16L 1/19 405/169 |
| 4,537,531 A * | 8/1985 | Diefenthaler | ............. | E02F 5/08 405/156 |
| 4,688,966 A * | 8/1987 | Esparza | .............. | E21B 43/0107 166/343 |
| 4,702,647 A * | 10/1987 | Esparza | .............. | E21B 43/0107 166/343 |
| 4,992,001 A * | 2/1991 | Harrison | .................... | F16L 1/18 405/166 |
| 5,011,333 A * | 4/1991 | Lanan | ....................... | F16L 1/23 405/166 |
| 5,667,035 A | 9/1997 | Hughes | | |
| 6,371,696 B1 * | 4/2002 | Eathorne | .................. | E02D 5/64 405/211 |
| 6,394,701 B1 * | 5/2002 | Delaforce | ................ | H02G 1/08 138/97 |
| 6,733,208 B2 * | 5/2004 | Stockstill | ................ | B63B 35/03 405/166 |
| 7,806,628 B2 * | 10/2010 | Willis | ....................... | F16L 1/19 166/360 |
| 2003/0016989 A1 * | 1/2003 | Wentworth | .......... | H02G 3/0468 403/56 |
| 2005/0062030 A1 * | 3/2005 | Wentworth | ............ | B66D 1/741 254/323 |
| 2009/0185867 A1 * | 7/2009 | Masters | ................... | F16L 1/123 405/216 |
| 2009/0272093 A1 | 11/2009 | Kuebel | | |
| 2010/0196100 A1 | 8/2010 | Soe-Jensen | | |
| 2011/0052324 A1 * | 3/2011 | Bruschi | ................... | B63B 35/03 405/166 |

FOREIGN PATENT DOCUMENTS

| | | |
|---|---|---|
| CN | 101715622 A | 5/2010 |
| EP | 0614258 A1 | 9/1994 |
| EP | 2116742 A2 | 11/2009 |
| EP | 2158654 B1 | 8/2011 |
| JP | 2002064917 A | 2/2002 |
| WO | 2004088810 A1 | 10/2004 |
| WO | 2008139190 A1 | 11/2008 |
| WO | 2010047584 A2 | 4/2010 |

OTHER PUBLICATIONS

Chinese Application No. 201280068853.8, Office Action issued on Mar. 3, 2016.

* cited by examiner

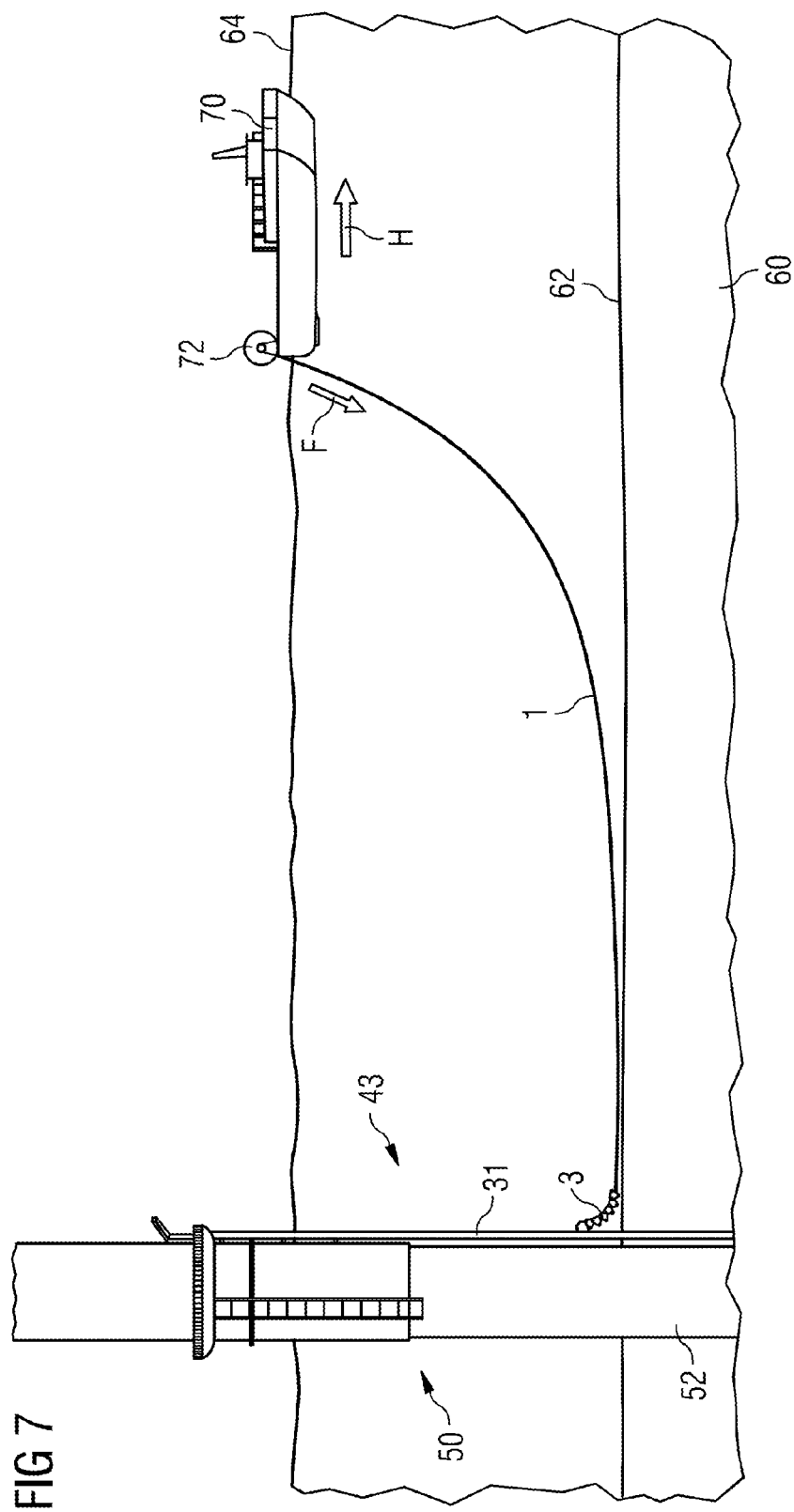

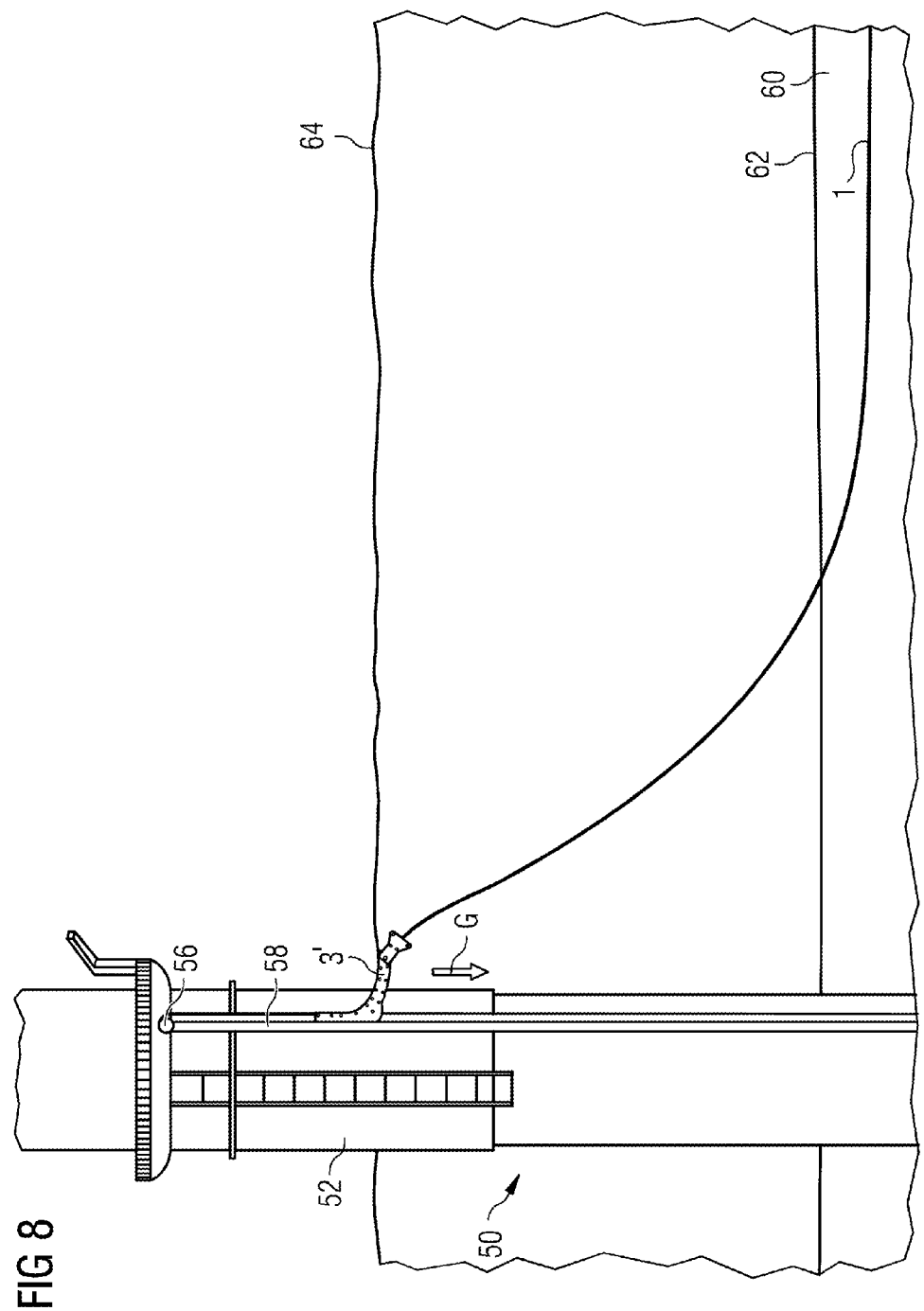

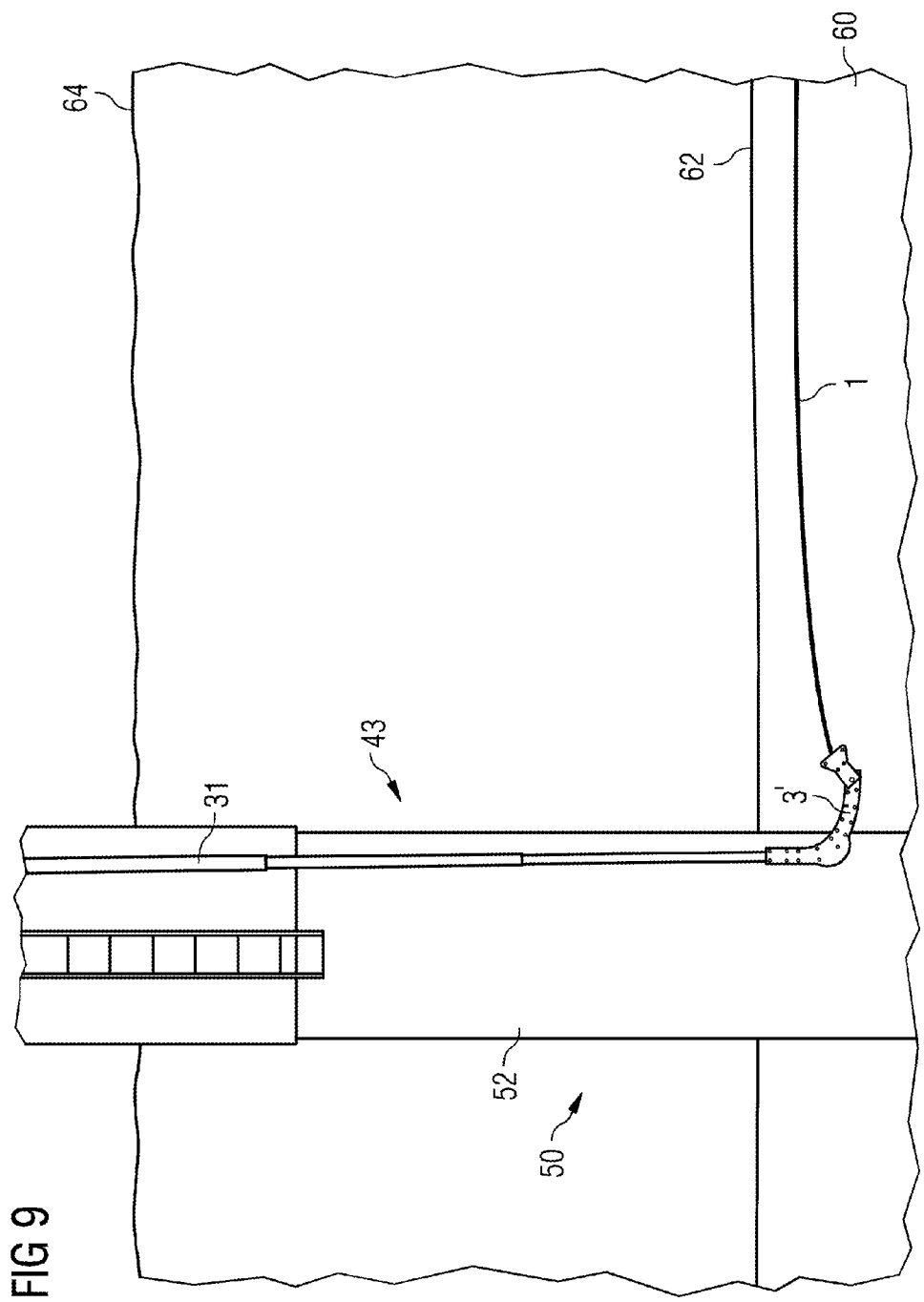

CABLE ASSEMBLY HOLDING APPARATUS

CROSS-REFERENCE TO RELATED APPLICATIONS

This application claims priority to PCT Application No. PCT/EP2012/064157, having a filing date of Jul. 19, 2012, based off of EP Application No. 12153686.6 having a filing date of Feb. 2, 2012, the entire contents of which are hereby incorporated by reference.

FIELD OF TECHNOLOGY

The following relates to a cable assembly holding apparatus for holding a cable assembly. The invention further concerns an offshore facility comprising a cable assembly holding apparatus and a method of suspending a cable assembly from an upper level of an offshore facility.

BACKGROUND

Sea cables are used for providing an electrical connection between offshore facilities such as an array of wind turbines in a wind park or several oil rigs or between off- and onshore facilities. A sea cable connecting two offshore facilities is usually guided vertically from an upper level of a first offshore facility along a pillar of its foundation structure towards the seabed, it is then lead to a course on the sea bed or below the sea bed and it is lastly guided vertically to an upper level of a second offshore facility. In the transition area between an upper level of an offshore facility and the seabed, sea cables are commonly held by means of a support arrangement. It protects the fragile electric leads inside a sea cable against mechanical stress.

A holding apparatus particularly designed for holding a sea cable suspended at an offshore facility is disclosed in EP 1 616 377 B1. An embodiment of this holding apparatus comprises a set of tubes holding a sea cable accommodated within the tubes over a distance between an upper level of an offshore facility and the seabed.

EP 2 158 654 B1 discloses a tubing arrangement for holding a sea cable suspending from an offshore facility towards the seabed by means of a single tube. This tube comprises a J-shaped curved section at its lower end for supporting the sea cable in a transition from a vertical to a horizontal direction.

Both solutions deliver reliable support and protection of a sea cable suspended at an upper level of the offshore facility and being guided to the seabed. The installation of a sea cable within a tubing arrangement according to these disclosures is however difficult. Usually, a sea cable is introduced into a supporting tube from a lower opening of the tube after the tube has been arranged at an offshore facility. As the lower opening of the tube is then positioned below the water surface, the installation requires the use of divers and/or of remotely operating vehicles. This makes the installation process cumbersome and dangerous.

SUMMARY

An aspect relates to a holding apparatus for cable assemblies which allows a simple and secure installation process of a cable assembly at an offshore facility.

This aspect is met by the cable assembly holding apparatus according to claims 1 to 11, the offshore facility according to claim 12 and the method according to claims 13 to 15.

In this context the expression "cable assembly holding apparatus" is used for any holding apparatus installed firmly at an offshore facility for holding a cable assembly but also for pieces of a holding apparatus, which are not yet completely assembled.

The term "sea cable" is understood as a heavily armoured electric cable. In differentiation from that term, the following description uses the expression "cable assembly" for denoting either a cable protected by a surrounding hose or just a hose without a cable inserted into it. The cable as possible part of a cable assembly is realized for transmitting any kind of signal or energy or fluid. It may for example (and preferably) be a power transmission cable arranged between a generator of an offshore wind turbine and an onshore transformer station or between an onshore power plant and an offshore oil rig.

An "offshore facility" can comprise a wind turbine or an oil rig or any type of subsidiary structure positioned in the sea or in a lake.

Accordingly, the cable assembly holding apparatus is realized to hold a power transmission cable assembly between an upper level of an offshore facility and a lower level. It differs from the state-of-the-art by comprising a set of (which means at least one and, preferably, a plurality) open tubes, wherein an open tube comprises a longitudinal slit along at least part of its length through which a cable assembly can be introduced into the open tube in an assembled state. The term "assembled state" expresses a final assembly of an open tube as part of a holding apparatus which is preferably mounted at an offshore facility including the cable assembly. The open tubes being part of the holding apparatus display a longish shape which is preferably rectilinear but can as well comprise a curvature. Apart from that, the long sides of the longitudinal slit preferably extend essentially parallel to the long sides of the holding apparatus and/or of the open tubes. Regarding the form of their diameter, said open tubes as part of the holding apparatus can for example be realized as cylindrical, square or polygonal pipes. Further, the holding apparatus and preferably the open tubes comprise interfaces for being mounted to a foundation structure of an offshore facility. The longitudinal slit for inserting a cable assembly sideways into a cavity of an open tube of the cable assembly holding apparatus proves advantageous as it provides a simple mechanism to introduce a cable assembly into a cable assembly holding apparatus and to remove it again. As the longitudinal slit is located at a side wall of an open tube, a cable assembly can be introduced into a cavity of the open tube above the water surface even if a lower section of the tube is positioned below the water surface. This simplifies the installation process of a cable assembly which can be carried out from a floating facility positioned nearby an offshore facility. Preferably, each open tube of the said set of open tubes comprises such type of longitudinal slit. Apart from that, the holding apparatus can comprise a combination of closed and open tubes, e.g. a set of open tubes together with a closed tube.

Preferably, the invention allows an arrangement of a cable assembly within a holding apparatus at an offshore facility without requiring the use of divers.

With reference to the cable assembly holding apparatus just described, the invention also concerns an offshore facility comprising such holding apparatus for securing a cable assembly between an upper level of the offshore facility and the seabed. The above-mentioned open tube set of the holding apparatus is preferably mounted to a foundation structure of the offshore facility, which can for example be a monopile or a pillar or any other base structure of a wind turbine, of an oil rig, etc.

Further, the invention concerns a method of suspending a cable assembly from an upper level of an offshore facility, which method comprises the following steps that can be carried out in any desired sequence:

Designed for protecting and supporting the cable assembly, an open tube set of the described cable assembly holding apparatus is mounted essentially vertically to the offshore facility via suitable interfaces. "Essentially" vertically means that the main orientation of the open tube set is vertical and that a construction, according to which the open tube set does not run straight-line from an upper region of the offshore facility to the seabed, but in a meandering way or any other way, is also included in the invention. Preferably, the open tube set is mounted along a foundation structure of an offshore facility. Related to this preferred scenario, an essentially vertical orientation comprises an orientation essentially parallel to a pillar or a set of pillars or any kind of base structure of the offshore facility, which pillar or set of pillars or base structure stands upright on the seabed, which position can be angular relative to the seabed. In this case, the pillar serves as a supporting structure of the open tube set.

The open tube set fulfils the function of supporting a cable assembly from an area where the cable assembly exits an interior part of the offshore facility, which area can for example be located at the transition piece of a wind turbine, to an area at the seabed, from where the cable assembly is guided to a second offshore or an onshore facility. Alike to the step of mounting an open tube set to an offshore facility, the later step of introducing a cable assembly into an open tube of the holding apparatus may usually be performed from a floating facility. A vessel can be positioned in the vicinity of an offshore facility, which vessel carries a drum, from which the cable assembly can be unrolled.

Particularly advantageous embodiments and features of the invention are given by the dependent claims, as revealed in the following description. Thereby, features revealed in the context of one of the methods may also be realized in the context of the respective other method and/or in the context of any one of the embodiments of the cable assembly holding apparatus and/or offshore facility and/or method of suspending a cable assembly according to the invention unless the contrary is explicitly stated and vice versa.

According to a preferred embodiment of the invention, the above-mentioned open tube set of the holding apparatus comprises a variable length, which is variable from an initial length to an extended final length. The extended final length of the open tube set comprises preferably a length of at least 10 meters, more preferably of at least 15 meters, and most preferably of at least 20 meters. An open tube set comprising a variable length is advantageous because the cable assembly holding apparatus can thus easily be adapted to different depths of water when being mounted to an offshore facility. As offshore facilities are used to be installed in areas with a considerable range of water depths, an adaptation of the open tube set of a holding apparatus is often necessary. This is especially the case considering the frequent development of scour holes around foundation structures and pillars of offshore facilities, which is caused by underwater currents. Varying ground levels due to emerging scour holes make a variable adaptation of the length of an open tube set particularly advantageous. The open tube set thus provides an adaptive support and protection arrangement of a cable assembly suspended at an offshore facility, hanging downwards to the seabed and being accommodated within the open tube set. Due to its variable length the open tube set does not need to be specifically measured according to its assigned location, but can be adapted to a wide range of water depths. Thus, it is easy to be manufactured and its transport requires less space compared to open tube sets displaying a non-variable length. Besides, the open tube set is easy to be arranged at its assigned location and the employment of divers can be substantially reduced.

A variable length of an open tube set can be particularly easy realized by a telescopic mechanism. Therefore, according to a preferred embodiment of the invention, the open tube set of the holding apparatus comprises at least two nested tube segments (in the following also named shortly "segments"), wherein an outer nested segment is realized to at least partially enclose an inner nested segment. This is preferably reached by means of a cavity extending along a length of an outer nested segment, wherein the diameter of the cavity is larger than a diameter of an outer wall of an inner nested segment. Any further nested segment being part of a telescopic open tube set would have to comprise a larger or smaller diameter than the cavities of the respective outer or inner nested segment. A variable length of the telescopic mechanism can be reached by a smooth adjustment of the single open tubes relative to each other. Apart from that, it can also be accomplished by a discrete adjustment of the open tubes in a manner that they are moved relative to each other in predefined steps. This kind of telescopic mechanism is a solution to provide a variable length to a set of open tubes, which is easy to be realized. For preventing the nested segments from falling apart during an installation process and/or in a final stage of assembly, the nested segments are preferably equipped with interlocking flanges which limit the length of extension of each open tube. As described before, the holding apparatus can comprise a combination of closed and open tubes. For instance, an outermost nested segment of the holding apparatus may be of a closed type, whereby the inner nested segments are open tubes or vice versa. If a combination of closed and open tubes is established, a closed tube may preferably be positioned at the top of the holding apparatus in a final state of assembly.

As mentioned above, an open tube comprises a longitudinal slit extending along at least part of its length. The longitudinal slit can for example be interrupted by bridges or beams. An embodiment may comprise an open tube not displaying a slit in an upper region of the tube being situated above the water surface in an assembled state of the holding apparatus. According to a preferred embodiment of the invention, said holding apparatus comprises a longitudinal slit extending over an entire length of an open tube. This provides the possibility of introducing a cable assembly into a cavity of an open tube at many different positions. Preferably each single tube of the open tube set comprises a longitudinal slit extending over its entire length. This is particularly advantageous when the said open tubes are attached to each other in a manner that the longitudinal slits are interconnected one after another and form a single longitudinal slit. According to this preferable embodiment of the invention the longitudinal slit can as well serve as a guiding rail for moving means along a length of the said large longitudinal slit by interfacing with the inner and/or outer surfaces of the open tubes. More than that, the longitudinal slits of each nested segment of a telescopic tube mechanism are preferably congruent when the nested segments are moved into each other such that the length and width of the longitudinal slits in each open tube are identical. Thus, a cable assembly can be introduced into a cavity of the open tube set of the cable assembly holding apparatus when the nested segments are telescoped.

Referring to the described longitudinal slit of an open tube of the holding apparatus, the width of the said slit is in an initial, unstressed state less than a diameter of the cable assembly in an initial, unstressed state such that the cable assembly is retained in the open tube. This solution is advantageous because it can prevent the cable assembly accommodated in a cavity of an open tube from slipping out of it. A slipping out of the cable assembly can for example be induced by the forces of gravity, of buoyancy and of water currents of waves to which the holding apparatus is exposed when mounted to an offshore facility positioned in the sea. According to this embodiment of the invention the cable assembly is moved through the longitudinal slit by exerting an amount of compressive or attractive force to the cable assembly by which for example a protective sheath and/or outer hose of the cable assembly is compressed and thus its diameter is temporarily diminished so that it can slip into a cavity of an open tube. In this case, however, the force exerted to the cable assembly is to be chosen such that it is less than a force which could damage electrical leads of the cable assembly.

Accordingly, the holding apparatus comprises a shield realized to at least partially cover the longitudinal slit of an open tube of the holding apparatus in order to retain a cable assembly in the open tube. Such a shield can comprise a curtain which can be unrolled along a length of the longitudinal slit from a drum positioned at an upper or a lower level of the open tube after inserting the cable assembly into the open tube. Alternatively, it could be thought of a shield in form of a hinged lid, mounted at an edge of the longitudinal slit. Apart from retaining the cable assembly in the open tube, a shield offers the advantage of protecting the cable assembly against mechanical stress and soiling when accommodated in an open tube.

According to a further advantageous embodiment of the invention, an edge of the longitudinal slit of an open tube, which open tube is part of a holding apparatus, comprises a deformable edge. The benefit of a deformable edge can be identified in an easy alteration of a width of the longitudinal slit. This proves advantageous for introducing and/or removing a cable assembly into/from a cavity of an open tube, which cable assembly comprises a diameter being larger than the width of the longitudinal slit in an initial state comprising un-deformed edges. The deformable edge is preferably elastic such that it returns to the initial state after being deformed. For providing an elastic quality, the deformable edge can comprise foam and/or a rubber material. Moreover, the deformable edge is preferably manufactured such that it cannot be deformed by mere forces of gravity, of buoyancy, of water currents or waves which can occur when an open tube comprising a longitudinal slit with a deformable edge is positioned below the water surface in the sea or in a lake. Such quality of a deformable edge can prevent the cable assembly from slipping out of a cavity of an open tube through a longitudinal slit. The deformable edge preferably is deformed by exerting a predefined amount of pressure to the cable assembly from an exterior and/or interior part of the open tube. If a surface of the cable assembly is positioned in touch with a surface of the deformable edge, the pressure exerted to the cable assembly is transferred to a surface of the deformable edge which is then deformed. The deformable edge can be deformed such that the width of the longitudinal slit is at least as great as the diameter of the cable assembly so that the cable assembly can be moved through the slit into the cavity of the open tube and/or removed from it. Additionally, a spreading device can widen the longitudinal slit by spreading the deformable edge in a respective area, where the cable assembly is to be introduced into and/or removed from a cavity of an open tube at a certain time.

Referring to the described deformable edge, which characterizes the longitudinal slit of an open tube as part of a holding apparatus, it is particularly advantageous to realize the deformable edge such that it faces inwardly into a cavity of the open tube. An inward-facing deformable edge makes the removal of a cable assembly from a cavity of an open tube through a longitudinal slit more difficult compared to a deformable edge not facing inwardly. Given a cable assembly comprising, in an initial state, a diameter larger than the width of the said longitudinal slit in an initial state, which cable assembly is accommodated in a cavity of an open tube, the resulting specific areas of force application are located such that according to this embodiment of the invention more pressure and/or pulling force is necessary to deform the deformable edge so that the cable assembly slips through the slit out of the tube than what is necessary for making the cable assembly slip into the tube. This is advantageous because it provides for a secure handling of the holding apparatus by preventing the cable assembly from slipping out of a cavity of an open tube after introducing it through the longitudinal slit. Preferably, a longitudinal slit of an open tube comprises inward-facing deformable edges on two long sides of the slit. Additionally, it is preferred that an inward-facing deformable edge comprises curved edges. The curvature of these curved, inward-facing and deformable edges of a longitudinal slit is preferably convex. This provides an even higher protection against an unwanted slipping out of a cable assembly accommodated in a cavity of an open tube.

A further advantageous quality of the holding apparatus is offered by an extending arrangement for extending the length of the open tube set. This extending arrangement controls the movement of nested segments as part of an open tube set relative to each other. Gravity can lead to an uncontrolled extending of the nested segments if the open tube set is arranged in a vertical position at an offshore facility. An extending arrangement can overcome the effect of gravity by limiting the extension of the open tube set as a whole and/or of single open tubes. The extending arrangement preferably comprises interfaces for connecting to an innermost and an outermost nested segment of the open tube set. This allows for determining the entire length of the open tube set. In addition to this solution, a further interface could be established between the extending arrangement and a nested segment positioned in between an innermost and an outermost nested. This would enable a controlled extension of an individual nested segment as part of the open tube set.

Preferably, the mentioned extending arrangement comprises a pilot guide and an actuating means for actuating the pilot guide. The pilot guide is preferably realized for serving at least one of two different functions: It can be used for extending and/or contracting the length of an open tube set and/or for moving a connected subsidiary means along a longitudinal slit of an open tube which open tube then serves as a guiding rail. The subsidiary means may for example comprise a curvature limiter for guiding a cable assembly from a vertical to a horizontal direction.

Using a pilot guide controlled by an actuating means proves to be a secure implementation of an extending arrangement, which is easy to be realized. Alternatively, an adjustment by means of a rack and pinion gearing can be established, but the method using the pilot guide is less mechanically complex and less prone to be disabled by corrosion and/or soiling. The pilot guide preferably displays a shape and size which enables it to be moved in a cavity of an open tube along a length of the cavity. More preferably, the pilot guide is movable in each nested segment of the open tube set being part of the cable assembly holding apparatus. The pilot guide preferably comprises interfaces for connecting it e.g. to an actuating means and/or to an open tube and/or to a subsidiary means, for example a curvature limiter. The actuating means is preferably realized as a wire being connectable to the pilot guide. The wire is preferably controlled by a winch that can be mounted at an upper level of an offshore facility. If a pilot guide is fixed within an open tube being part of the holding apparatus and if a wire is attached to the pilot guide, an unrolling of the wire from a winch positioned at an upper level of an offshore facility may lead to a lowering of the pilot guide towards the seabed and thus to an extension of the length of the open tube set. A rolling up of the wire on the winch however leads to a reversion of the described process and thus to a contraction of the length of the open tube set. According to an embodiment of the invention, a method of suspending a cable assembly from an upper level of an offshore facility comprises the use of the described pilot guide.

As a further advantageous embodiment, the holding apparatus comprises a cable assembly curvature limiter for effecting a transition of a cable assembly from an essentially vertical direction to an essentially horizontal direction, while maintaining a minimum bending radius. The criteria "bending radius" together with "bending angle" define a "curvature" of a cable assembly arranged within a curvature limiter. The term "bending angle" in this context defines an angle between a main direction of a first section of a curvature limiter and a main direction of a last section of a curvature limiter. The term "maximum bending angle" defines an angle between a main direction of a first section of a curvature limiter and an extreme direction of a cable assembly exiting a last section of a curvature limiter, which extreme direction is determined by a minimum "bending radius" of a cable assembly.

As already mentioned, the holding apparatus is designed to support a cable assembly suspended at an upper level of an offshore facility and being guided to the seabed. On arriving at the seabed, the cable assembly changes its course—depending on the topography of the seabed—about an angle of approximately 90° and proceeds in a horizontal direction on or below the seabed. A curvature limiter supporting the cable assembly in this transition area ensures to maintain a minimum bending radius of a specific cable assembly held by the curvature limiter so that the cable assembly is not damaged by excessive bending. Featuring this quality, the curvature limiter contributes to a secure power transmission between offshore and/or onshore facilities. The curvature limiter preferably is realized to accommodate a cable assembly. It can preferably be fixed to the holding apparatus such that in an area of exiting a cavity of an open tube of the holding apparatus the cable assembly enters a duct of the curvature limiter. The curvature limiter can be realized comprising a fixed or a variable curvature. Preferably, it comprises an interface for being connected to a pilot guide. More preferably, the curvature limiter can be moved along a length of an open tube so that an interface connecting the curvature limiter and the pilot guide is moved through the longitudinal slit of the open tube.

Referring to the method of suspending a cable assembly from an upper level of an offshore facility by means of a cable assembly holding apparatus, it is advantageous to extend the length of the open tube set as part of the holding apparatus to the seabed after mounting it to the offshore facility. Preferably the open tube set is extended such that an end section of an open tube is flushed into the sea bed. This proves to be advantageous because negative effects of scour holes can easily be compensated. Scour holes can lead to changes in the geometry of cable support arrangements and thus to a possibly damaging bending radius of electrical cables suspended at offshore facilities. A protective mechanism is established by using the open tube set being part of the holding apparatus as a guiding rail and moving the curvature limiter connected to the holding apparatus down a lower open tube during the emerging of a scour hole. This downward movement is performed either by self-adaptation of the curvature limiter through gravity pulling it to the ground or by a controlled movement steered by an actuating means. Moreover, the negative effects of emerging scour holes are also minimized by the curvature limiter itself whose curvature adapts—within a limited range, i.e. up to a predefined minimum bending radius determined by the cable assembly inserted within it—continuously to a variable ground level by the force of gravity and thus prevents the cable assembly from excessive bending.

The mentioned methods of suspending a cable assembly from an offshore facility by means of a cable assembly holding apparatus and of using a pilot guide for extending an open tube set of a holding apparatus may comprise further steps.

A cable assembly curvature limiter has been mentioned as an advantageous embodiment of the invention of a holding apparatus. Establishing a connection between the curvature limiter and the pilot guide suspended in a cavity of an open tube enables the curvature limiter to be guided when moving it along a length of the open tube. This movement can be controlled by an actuating means comprising a wire attached to the pilot guide and a winch for controlling the wire. This method proves advantageous as it simplifies the step of arranging the cable assembly within the curvature limiter. The cable assembly can thus be introduced into a duct of the curvature limiter before the curvature limiter is arranged at a designated position at or below the surface of the seabed. As the longitudinal slit of an open tube can serve as a guiding rail for moving a curvature limiter connected to a pilot guide along a length of the open tube, the curvature limiter can be positioned at any section of the open tube set. This is especially the case, if the telescopic mechanism is extended to a maximum length. As a consequence, the cable assembly can be introduced into the curvature limiter at an upper level of an upper nested segment of the open tube set mounted to an offshore facility and thus on a level above the water surface. This method is particularly advantageous because it does not require the use of divers and of remotely operating vehicles for performing an underwater introduction process which is dangerous and time-consuming. The step of introducing a cable assembly into a curvature limiter is preferably performed from a floating facility positioned nearby the offshore facility.

According to a further step of the described method, a cable may be introduced into a flexible outer hose of the cable assembly, whereby the cable preferably is a terrestrial cable. This step provides a benefit compared to using an armored sea cable according to the state-of-the-art because terrestrial cables are easier to manufacture than sea cables. Apart from that, a resistance against possibly damaging influences comparable to a conventional armor is provided by the flexible outer hose.

The step of introducing the cable into the flexible outer hose may be preferably carried through above the surface of the sea bed and more preferably above the water surface. This method is advantageous because it does not require divers or remotely operated vehicles. When using a method of pushing and pulling a cable into the flexible outer hose, this step can be applied after the steps of arranging the flexible outer hose of the cable assembly in the holding apparatus, of flushing the flexible outer hose into the seabed and of arranging it in a holding apparatus of a second offshore facility. The method of pushing and pulling a cable comprises at least the steps of introducing a messenger wire into the flexible outer hose, of pulling the cable into the flexible outer hose by means of the messenger wire and of pushing the cable into the flexible outer hose by means of a "push"-device known from prior art.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION

Some of the embodiments will be described in detail, with reference to the following figures, wherein like designations denote like members, wherein:

FIG. 7 shows a view of an advanced step in the process of installing a cable assembly according to FIG. 6;

FIG. 8 shows a view of a step in the process of installing a cable assembly in a cable assembly support arrangement comprising a second embodiment of a curvature limiter at an offshore facility;

FIG. 9 shows a view of an advanced step in the process of installing a cable assembly in a cable assembly support arrangement comprising a second embodiment of a curvature limiter at an offshore facility.

DETAILED DESCRIPTION

Figure 1:
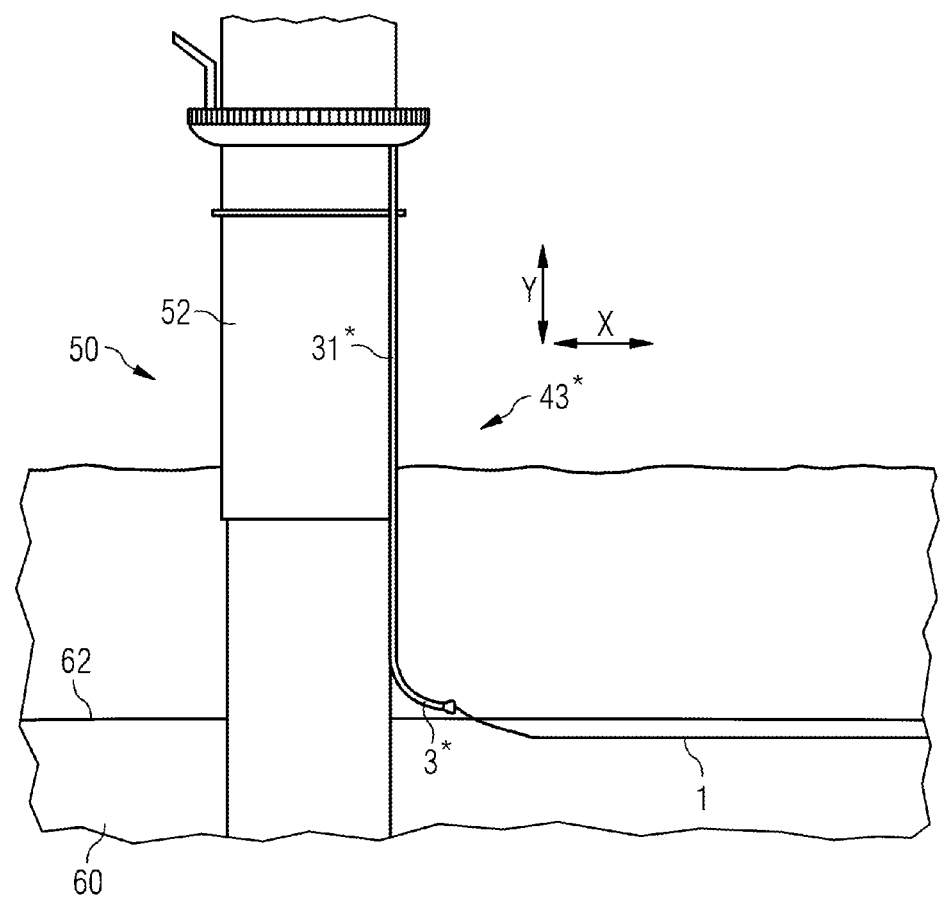
FIG. 1 shows a side view of a cable assembly support arrangement according to the state-of-the-art being arranged at an offshore facility.

FIG. 1 shows a view of a cable assembly support arrangement 43* according to the state-of-the-art. A cable assembly holding apparatus 31* is mounted to a pillar 52 of an offshore facility 50. At its bottom opening the cable assembly holding apparatus 31* comprises a curvature limiter 3* designed for bending a cable assembly 1 from a vertical direction Y to a horizontal direction X. The curvature limiter 3* comprises a fixed curvature and a fixed bending angle of an inserted cable assembly 1. Such type of arrangement comprising a holding apparatus 31* and a curvature limiter 3* is known as a "J-tube". The bottom end of the curvature limiter 3* is positioned on the surface 62 of the seabed 60 and comprises an opening where the cable assembly 1 exits the curvature limiter 3* and proceeds to a level below the surface 62 of the seabed 60.

Figure 2:
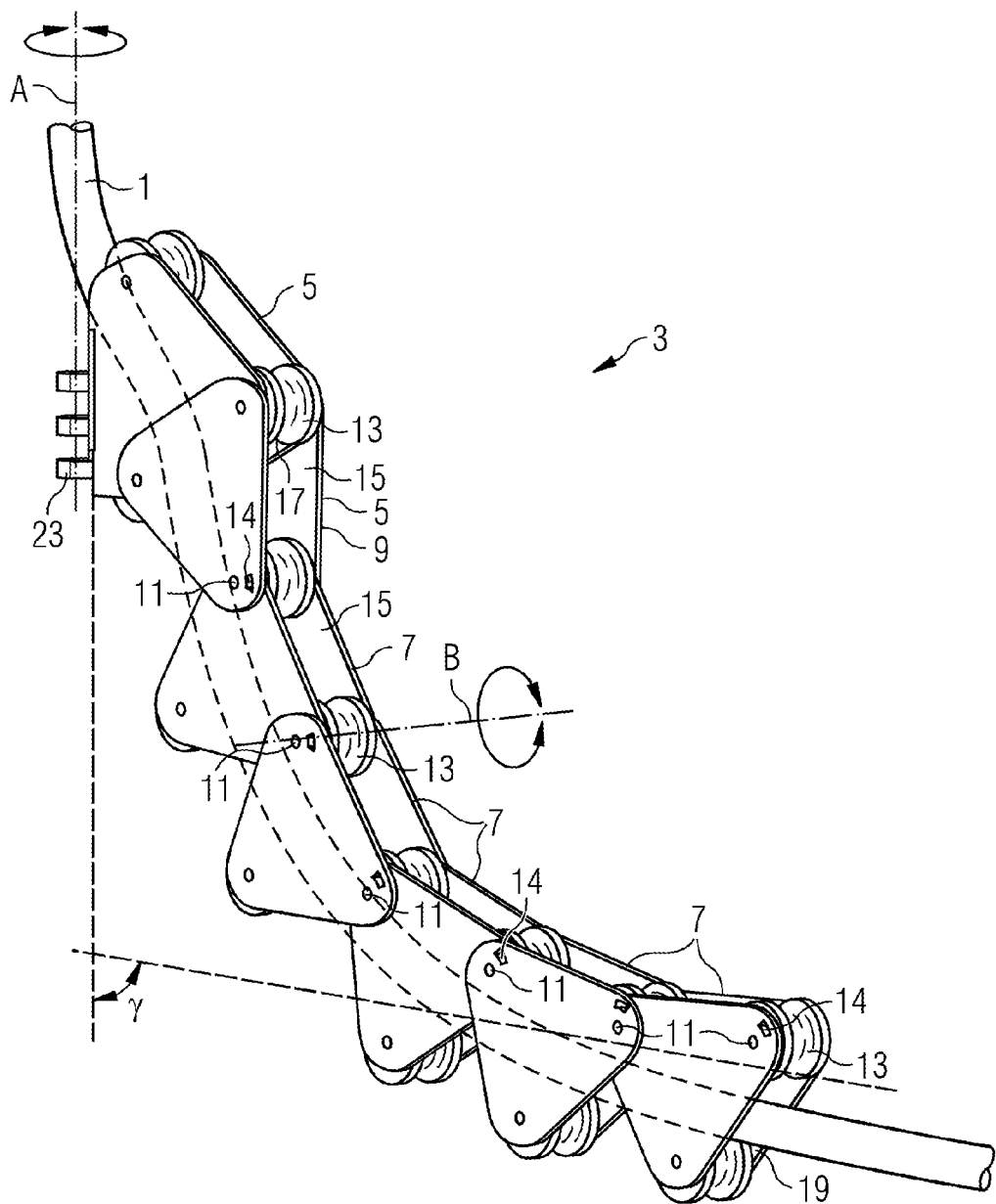
FIG. 2 shows a view of a cable assembly curvature limiter according to a first embodiment.

FIG. 2 shows a view of a first possible embodiment of a curvature limiter 3 for guiding a cable assembly 1, which curvature limiter 3 comprises a number of rigid segments 5 (in FIG. 2 two rigid segments are displayed) and a number of hinged segments 7, each of which hinged segments 7 can be twisted in a common plane, that is orthogonal to a rotation axis B. The rigid and hinged segments 5, 7 each comprise two essentially triangular shaped frame parts 9 which are connected to each other by three axes 11 mounted to three corner regions of the two triangular shaped frame parts 9. Each rigid segment 5 and each hinged segment 7 further comprises three rollers 13 mounted on the axes 11 connecting the frame parts 9. These axes 11 serve as rotation axes B of the rollers 13 and as rotation axes B of the hinged segments 7 when the hinged segments 7 are twisted against each other. The rotation angle of the hinged segments 7 is limited by stoppers 14. The maximum rotation angle for a rotation of two adjacent hinged segments 7 against each other is preferably lower than 30° and more preferably lower than 15°. Together with two inner surfaces 15 of the triangular shaped frame parts 9, one surface 17 of each roller 13, which surface 17 in a given position of the rollers 13 points to an inner side of the rigid segments 5 or hinged segments 7, form a cable assembly duct 19. In a cross-sectional view the rollers 13 display an H-shaped or U-shaped form preferably adapted to the outer form of the cable assembly. A "combined" rotation angle γ of a series of connected rigid segments 5 and hinged segments 7 determines the curvature of the curvature limiter 3 and thus a bending of a cable assembly 1 inserted in the curvature limiter 3. If the curvature limiter 3 comprises two rigid segments 5 and five hinged segments 7, which rigid segments 5 provide a bending angle of a cable assembly 1 of 20° and which hinged segments 7 can each be twisted about an angle of 15°, in addition of these values a maximum bending angle γ of a cable assembly 1 of 95° can be reached.

Figure 5:
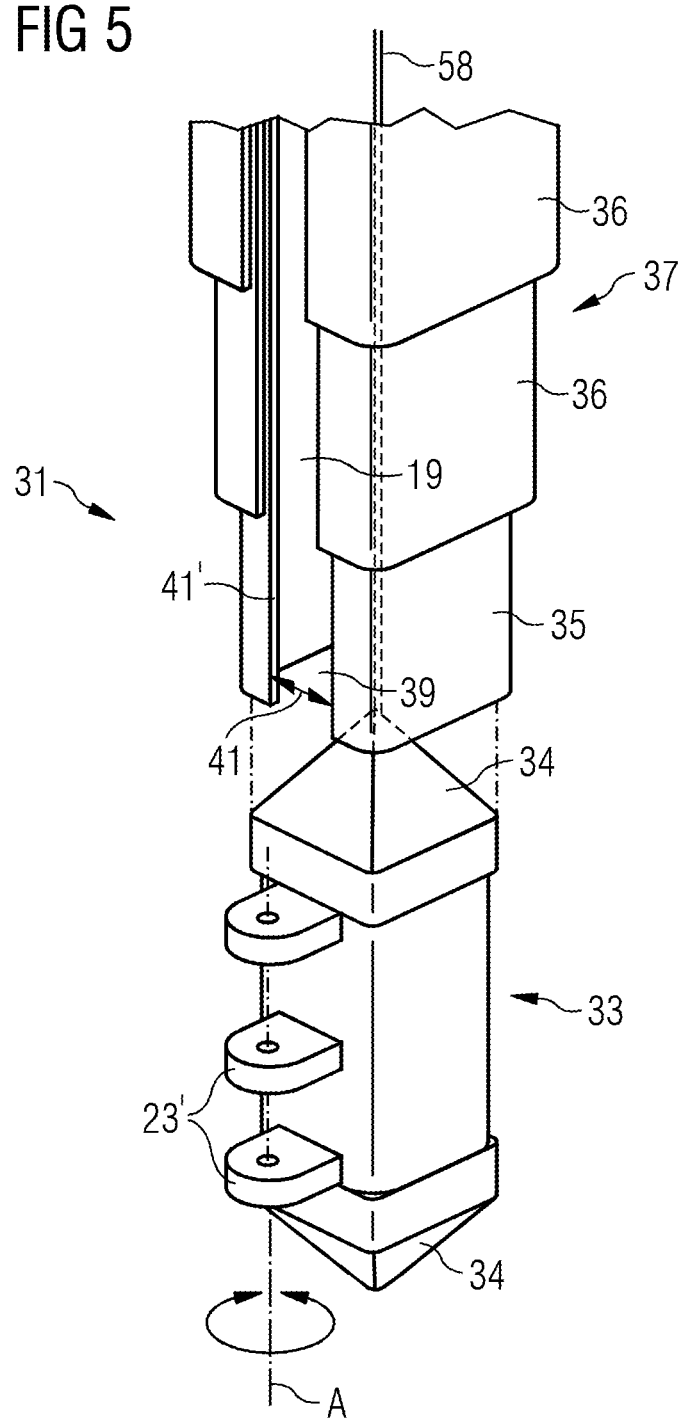
FIG. 5 shows a view of a part of a cable assembly holding apparatus.

A rigid segment 5 forming an end segment of the curvature limiter 3 comprises a connective interface 23 for mounting the curvature limiter 3 to a properly constructed pilot guide connective interface 23' (displayed in FIG. 5). The connective interface 23 comprises an arrangement for rotating the rigid segment 5 forming an end segment of the curvature limiter 3 and thus the curvature limiter 3 itself when the said rigid segment 5 is connected to a pilot guide. This rotation axis A lies preferably in a 90° angle related to the rotation axis B of the hinged segments 7 of the curvature limiter 3. A maximum rotation angle of the connective interface 23 of the curvature limiter 3 against the pilot guide connective interface 23' (not displayed in FIG. 2) about a rotation axis A is preferably less than 90° and more preferably less than 20°.

Figure 3:
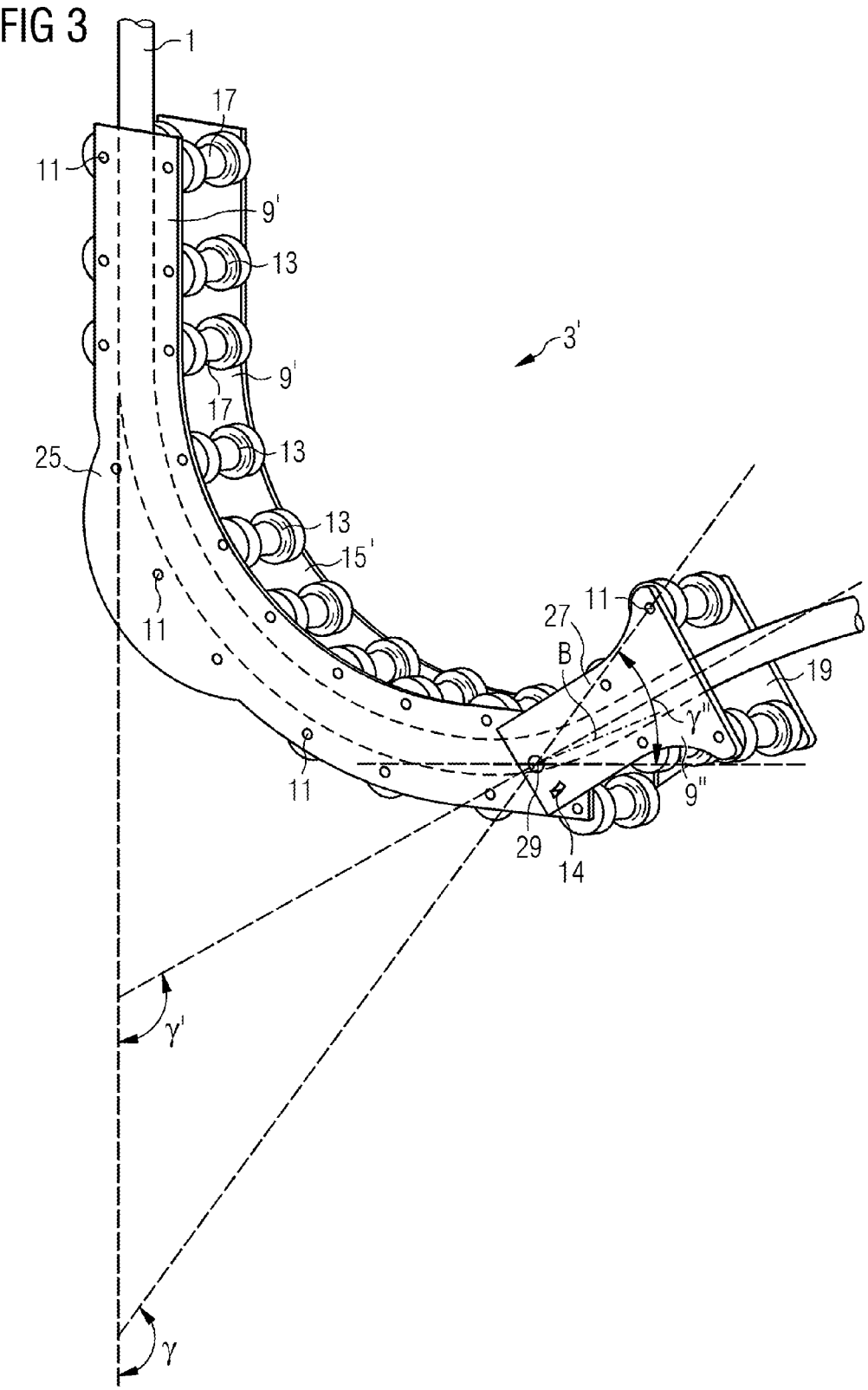
FIG. 3 shows a view of a cable assembly curvature limiter according to a second embodiment.

FIG. 3 shows a view of a second possible embodiment of a curvature limiter 3' for guiding a cable assembly 1, which curvature limiter 3' comprises a curved rigid segment 25 and a smaller hinged end segment 27. The hinged end segment 27 can be twisted about a rotation axis B. The curved rigid segment 25 comprises a pair of frame parts 9', the hinged end segment 27 comprises a pair of frame parts 9". These pairs of frame parts 9', 9" are interconnected by a number of axes 11. The curved rigid segment 25 and the hinged end segment 27 comprise rollers 13 mounted to the axes 11 connecting the two pairs of frame parts 9', 9". These axes 11 thus serve as rotation axes of the rollers 13. Together with two inner surfaces 15' of the frame parts 9', 9", a surface of each roller 13, which surface in a given position of the roller 13 points to an inner side of the curved rigid segment 25 or hinged end segment 27, forms a cable assembly duct 19. In a cross-sectional view the rollers 13 display an H-shaped form or U-shaped form preferably adapted to the outer form of the cable assembly. A bending angle $\gamma'$ is defined by a main direction of a cable assembly 1 entering the curved rigid segment 25 relative to a main direction of the cable assembly 1 exiting a connected hinged end segment 27 of the curvature limiter 3', wherein the hinged end segment 27 is twisted upwards with a maximum rotation angle of preferably 20°. If the cable assembly 1 leaves a main direction and instead is bended upwards when exiting the hinged end segment 27, wherein its bending is limited by an upper roller 13 of the hinged end segment 27, a maximum bending angle $\gamma$ of the cable assembly 1 inserted in the curvature limiter 3' is reached. In this position, the rotation angle $\gamma''$ of the hinged end segment 27 relative to the curved rigid segment 25, which is limited by stoppers 14, preferably amounts to a maximum angle of about 20°. The bending angles $\gamma$, $\gamma'$ determine the bending of a cable assembly 1 inserted in the curvature limiter 3'. The maximum bending angle $\gamma$ is equivalent to the rotation angle $\gamma''+90°$. The width of the mouth of the hinged end segment 27 corresponds to the difference between a bending angle $\gamma'$ and a maximum bending angle $\gamma$ of a cable assembly 1 inserted into a cable duct 19. The curvature limiter 3' can be mounted to an end opening of an open tube (35, 36) or of a closed tube such that a cable assembly 1 exiting the lower opening of the tube enters a cable assembly duct 19 of the curvature limiter 3' preferably without being bended.

Figure 4:
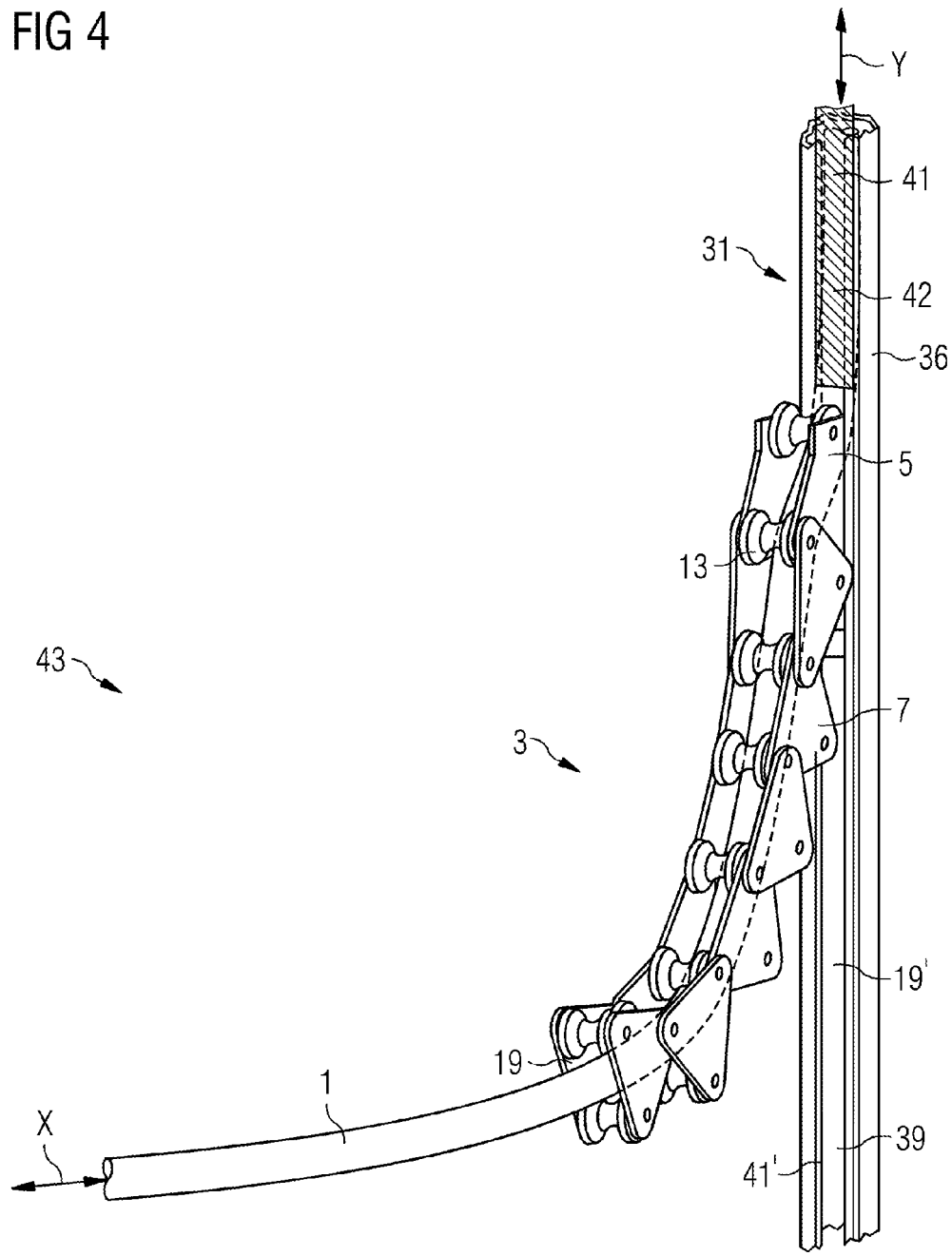
FIG. 4 shows a view of a part of an assembled cable assembly support arrangement.

FIG. 4 shows a view of a middle part of an assembled cable assembly support arrangement 43 comprising a cable assembly holding apparatus 31 and a curvature limiter 3 (according to the embodiment displayed in FIG. 2). A cable assembly 1 is inserted into a cable assembly duct 19, 19' of an open tube 36 of the cable assembly holding apparatus 31 and of the curvature limiter 3. The cable assembly 1 is thus supported on a course from a vertical direction Y to a horizontal direction X. An open tube 36 as part of a telescopic arrangement 37 comprises a longitudinal slit 41 whose edges 41' are deformable and preferably curved inwards into a cavity 39 of the open tube 36. A shield 42 which can for example be realized as a kind of a curtain covers a section of the longitudinal slit 41 of the open tube 36 and thus prevents the cable assembly 1 from slipping out of the cavity 39 of the open tube 36 respectively out of the cable assembly duct 19'. A rigid segment 5 of the curvature limiter 3 is connected to a pilot guide (hidden in the cavity 39 of the open tube 36).

FIG. 5 shows a view of a lower end part of a cable assembly holding apparatus 31 comprising a pilot guide 33 for moving a curvature limiter 3, 3' along a length of the cable assembly holding apparatus 31. The pilot guide 33 displays a size adapted to an innermost nested segment 35 of the set of open tubes 36 of the telescopic arrangement 37 being part of the cable assembly holding apparatus 31. The pilot guide 33 comprises a pyramidal section 34 at a top and a bottom part of it so that it can be moved easily up and down within the cavities 39 of each open tube 35, 36 constituting the telescopic arrangement 37. A wire 58 can be attached to a tip of the pyramidal sections 34 for altering the position of the pilot guide 33 within the cavities 39. Moreover, the pilot guide 33 comprises a pilot guide connective interface 23' for being connected to a connective interface 23 of the curvature limiter 3. The pilot guide connective interface 23' displays a size adapted to the width of a longitudinal slit 41 of the telescopic arrangement 37 of the cable assembly holding apparatus 31, which width is about 120 mm and hence large enough for inserting a cable assembly 1. The pilot guide connective interface 23' comprises an arrangement for rotating a connected curvature limiter 3. Further, the cavities 39 of the open tubes 36 of the telescopic arrangement 37 form a cable assembly duct 19' which comprises a longitudinal slit 41 on one side.

Figure 6:
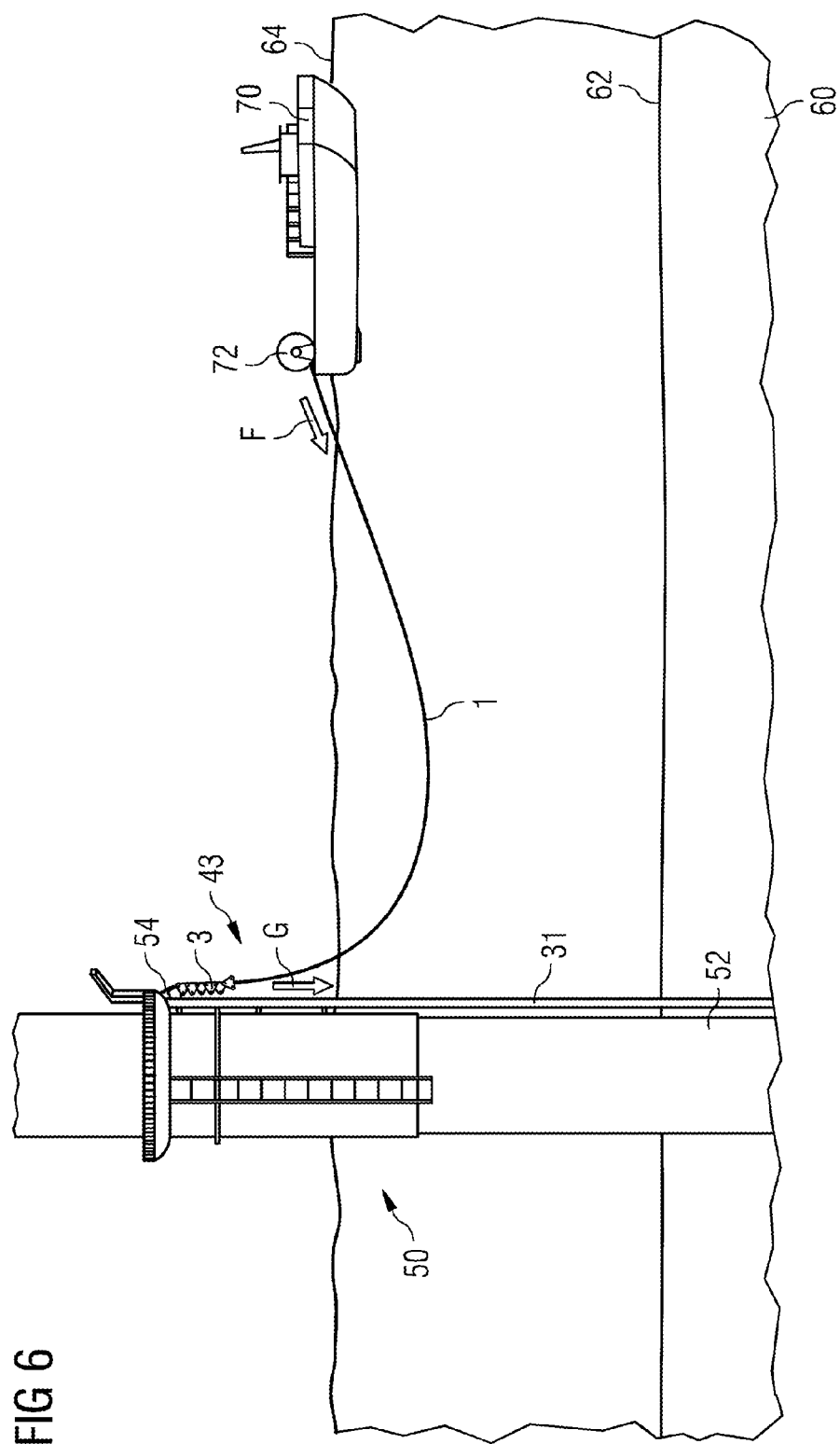
FIG. 6 shows a view of a step in the process of installing a cable assembly in a cable assembly support arrangement comprising a first embodiment of a curvature limiter at an offshore facility.

FIG. 6 shows a view of a step in the process of installing a cable assembly 1 to a cable assembly support arrangement 43 arranged at an offshore facility 50. This step is carried out before an end segment of a cable assembly 1 is installed on the seabed 60. The set of open tubes 36 of the cable assembly holding apparatus 31 is mounted to a pillar 52 of the offshore facility 50 and is then extended to a level below the surface 62 of the seabed 60. After that, a curvature limiter 3 is arranged at a top end of the set of open tubes 36, which position is at the same time a level above the water surface 64. A floating facility 70 comprising a cable assembly drum 72 is positioned near a pillar 52 of the offshore facility 50. The cable assembly 1 is being unrolled from the cable assembly drum 72 in a direction F. A first end segment of the cable assembly 1 is fixed at the offshore facility 50 at a fixing point 54 while a second end segment of the cable assembly 1 is deposed on board of the floating facility 70. Before fixing a cable assembly 1 at the fixing point 54, a segment of the cable assembly 1 is inserted into the curvature limiter 3. After that, the curvature limiter 3 is being moved downwards to the seabed in a direction G by means of a wire 58 controlled by a winch 56 (as displayed in FIG. 8).

FIG. 7 shows a view of an advanced step in the process of installing the cable assembly 1 to the cable assembly support arrangement 43 arranged at the offshore facility 50 according to FIG. 6. This step is carried out before an end segment of the cable assembly 1 is installed on the seabed 60. Here, the curvature limiter 3 has been positioned at a surface 62 of the seabed 60. The cable assembly 1 is further unrolled from a cable assembly drum 72 positioned at the floating facility 70 in a direction F. At the same time, the floating facility 70 moves away from the offshore facility 50 in a direction H, deposing the cable assembly 1 on the seabed 60.

FIG. 8 shows a view of a step in the process of installing a cable assembly 1 to a cable assembly support arrangement 43 arranged at an offshore facility 50 using a curvature limiter 3' according to FIG. 3. This step is carried out after a segment of the cable assembly 1 has been installed on or below a level defined by the surface 62 of the seabed 60 and after an end segment of the cable assembly 1 has been installed at a second offshore facility 50. Again, the curvature limiter 3' comprises an inserted cable assembly 1, whereby the step of insertion has been performed above a level defined by the water surface 64, and the curvature limiter 3' is transferred from a position above the water surface 64 towards the seabed 60 in a direction G. This movement is executed by means of a winch 56 and a wire 58 attached to the winch 56, to the curvature limiter 3 and to a bottom region of the pillar 52 of the offshore facility 50, similar to the process described above in connection with FIGS. 6 and 7.

FIG. 9 shows a view of a final step in a different process of installing a cable assembly 1 to a cable assembly support arrangement 43 arranged at an offshore facility 50. Here, the curvature limiter 3' is connected to a bottom end of a set of closed tubes comprising a telescopic mechanism. A cable assembly 1 inserted into a cavity of the set of closed tubes enters the cable assembly duct 19' of the curvature limiter 3' without being bended. The curvature limiter 3' is displayed being positioned on a level below the surface 62 of the seabed 60. Consequently, a lower opening of the curvature limiter 3' is positioned below the surface 62 of the seabed 60 so that the cable assembly 1 exiting the curvature limiter 3' proceeds on a level below the surface 62 of the seabed 60 as well. As displayed in FIG. 8, the curvature limiter 3' may be connected to a single open tube without a telescopic mechanism or alternatively to a set of open tubes firmly connected to each other at their open endings.

Although the present invention has been disclosed in the form of preferred embodiments and variations thereon, it will be understood that numerous additional modifications and variations could be made thereto without departing from the scope of the invention. For example, the curvature limiters 3, 3' described in the process according to FIGS. 6 and 7 may also be used in a process similar to FIG. 8 or 9 and vice versa. Also, individual parts of a specific curvature limiters 3, 3' (as described above), e.g. the hinged end segment 27 comprising a mouth, a segment with a connective interface 23, etc. can be used in connection with another curvature limiter in order to construct an amended type of curvature limiter. Further, a cable assembly 1 may also be removed or exchanged easily if the procedure described in connection with the mentioned figures is reversed to an opposite direction. Such reversed procedure can for example comprise the steps of moving the curvature limiter 3 upwards while at the same time rolling the cable assembly 1 onto a drum 72 of a floating facility 70.

For the sake of clarity, it is to be understood that the use of "a" or "an" throughout this application does not exclude a plurality, and "comprising" does not exclude other steps or elements.

The invention claimed is:

1. A cable assembly holding apparatus configured to hold a cable assembly between an upper level of an offshore facility and a lower level, the cable assembly holding apparatus comprising;
    an open tube mounted to a pillar of the offshore facility, the open tube having a longitudinal slit along at least part of a length of the open tube, through which the cable assembly is received within the open tube in an assembled state, wherein a top end of the open tube is located above a water surface level; and
    a curvature limiter operably coupled to the open tube at the top end of the open tube, the cable assembly being introduced into the curvature limiter when the curvature limiter is positioned above the water surface level.

2. The holding apparatus according to claim 1, wherein the length of the open tube is variable from an initial length to an extended length.

3. The holding apparatus according to claim 2, wherein the open tube is configured in a telescopic manner with at least two nested segments, wherein an outer nested segment is configured to at least partially enclose an inner nested segment.

4. The holding apparatus according to claim 1, wherein the longitudinal slit extends over an entire length of the open tube.

5. The holding apparatus according to claim 1, wherein a width of the longitudinal slit of the open tube in an initial state of the open tube is less than a diameter of the cable assembly in an initial state of the cable assembly such that the cable assembly is retained in the open tube.

6. The holding apparatus according to claim 1, comprising a shield configured to at least partially cover the longitudinal slit of the open tube in order to retain ft the cable assembly in the open tube.

7. The holding apparatus according to claim 1, wherein an edge of a longitudinal slit of the open tube comprises a deformable edge.

8. The holding apparatus according to claim 1, wherein an edge of a longitudinal slit is configured to face inward into a cavity of the open tube in order to retain the cable assembly in the open tube.

9. The holding apparatus according to claim 1, comprising an extending arrangement for extending the length of the open tube.

10. The holding apparatus according to claim 1, comprising a pilot guide and an actuating means for actuating the pilot guide.

11. The holding apparatus according to claim 1, wherein the cable assembly curvature limiter effects a transition of the cable assembly from an essentially vertical direction to an essentially horizontal direction, while maintaining a minimum bending radius.

12. An offshore facility comprising a cable assembly holding apparatus according to claim 1 for securing a cable assembly between an upper level of the offshore facility and the seabed, wherein the open tube of the cable assembly holding apparatus is mounted essentially vertically to the offshore facility.

13. A method of suspending a cable assembly from an upper level of an offshore facility, the method comprising:
    mounting an open tube of a cable assembly holding apparatus essentially vertically to a pillar of the offshore facility, wherein the open tube comprises a longitudinal slit along at least part of a length of the open tube, further wherein a top end of the open tube is located above a water surface level;
    operably coupling a curvature limiter to the open tube at the top end of the open tube, the cable assembly being introduced into the curvature limiter; and
    receiving a cable assembly through the longitudinal slit into the open tube of the holding apparatus.

14. The method according to claim 13, comprising the step of extending the length of the open tube to extend to or into the seabed, wherein this step of extending the length comprises the steps of:
    mounting an extending arrangement to the open tube, the extending arrangement having a pilot guide and an actuating means, and
    actuating the pilot guide such that the open tube is extended towards the seabed.

15. The method according to claim 14, wherein the cable assembly curvature limiter is connected to the pilot.

16. The holding apparatus of claim 1, wherein the curvature limiter is movable along the length of the open tube in a vertical direction.

17. The holding apparatus of claim 1, wherein the cable assembly is at least one of a cable protected by a surrounding hose and a hose without a cable inserted into the hose.

18. The holding apparatus of claim 1, wherein the cable assembly is a power transmission cable arranged between a generator of an offshore wind turbine and an onshore transformer station.

19. The holding apparatus of claim 1, wherein the cable assembly is a power transmission cable arranged between an onshore power plant and an offshore oil rig.

* * * * *